United States Patent
Martin

(10) Patent No.: US 6,684,255 B1
(45) Date of Patent: Jan. 27, 2004

(54) METHODS AND APPARATUS FOR TRANSMISSION AND RENDERING OF COMPLEX 3D MODELS OVER NETWORKS USING MIXED REPRESENTATIONS

(75) Inventor: Ioana Maria Martin, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/482,176

(22) Filed: Jan. 12, 2000

Related U.S. Application Data

(60) Provisional application No. 60/161,428, filed on Oct. 26, 1999.

(51) Int. Cl.⁷ .............................................. G06F 15/16
(52) U.S. Cl. ...................... 709/231; 709/232; 709/233; 345/419; 345/420; 345/421
(58) Field of Search ................. 345/419–421, 345/427, 423, 440; 700/232, 233, 231, 226; 709/102; 707/1; 704/9

(56) References Cited

U.S. PATENT DOCUMENTS

| | | | | |
|---|---|---|---|---|
| 5,202,987 A | * | 4/1993 | Bayer et al. ................ | 709/102 |
| 5,675,721 A | | 10/1997 | Freedman et al. | |
| 5,751,931 A | * | 5/1998 | Cox et al. .................... | 345/440 |
| 5,754,939 A | * | 5/1998 | Herz et al. ................. | 455/3.04 |
| 5,794,178 A | * | 8/1998 | Caid et al. ..................... | 704/9 |
| 5,801,707 A | * | 9/1998 | Rolnik et al. ................ | 345/853 |
| 6,008,814 A | * | 12/1999 | Baldwin et al. ............. | 345/427 |
| 6,151,595 A | * | 11/2000 | Pirolli et al. .................... | 707/1 |
| 6,256,041 B1 | * | 7/2001 | Deering ....................... | 345/426 |
| 6,342,830 B1 | * | 1/2002 | Want et al. ................ | 340/10.1 |
| 6,369,819 B1 | * | 4/2002 | Pitkow et al. .............. | 345/440 |

OTHER PUBLICATIONS

G. Taubin et al., "Geometry Compression Through Topological Surgery," ACM Transactions on Graphics, vol. 17, No. 2, Apr. 1998, pp. 84–115.

H. Hoppe, "Progressive Meshes," Proc. Siggraph'96, Aug. 1996, pp. 99–108.

B.–O. Schneider et al., "An Adaptive Framework for 3D Graphics in Networked and Mobile Environments," Proc. Workshop on Interactive Applications of Mobile Computing (IMC'98), Nov. 1998, 8 pages.

(List continued on next page.)

Primary Examiner—Hosain T. Alam
Assistant Examiner—Shabana Qureshi
(74) Attorney, Agent, or Firm—L. P. Herzberg

(57) ABSTRACT

Three dimensional models having one or more model components stored in model databases, accessed by servers, and being viewed interactively from client computers are processed for transmission over a network. A model hierarchy is built with one or more nodes, by clustering together one or more of the model components based on one or more clustering criteria. One or more representations are associated with each node in the hierarchy. A cost function is associated with the model hierarchy and used to determine a cost of each representation at each node. A visibility of each node in the hierarchy is evaluated and associated with the respective node. A contribution of each node to an image of the 3D model to be rendered by one or more of the clients is evaluated. The 3D model hierarchy is traversed to select one or more of the representations to be transmitted to the client using a prioritization scheme that accounts for the visibility and contribution of each respective nodes.

21 Claims, 12 Drawing Sheets

OTHER PUBLICATIONS

A. J. Garvey and V. R. Lesser, "Design–to–Time Real–Time Scheduling," *IEE Transactions on Systems, Man, and Cybernetics*, 23(6), 1993, pp. 1491–1500.

P. W. C. Maciel and P. Shirley, "Visual Navigation of Large Environments Using Textured Clusters," Symposium on Interactive 3D Graphics, 1995, pp. 95–102.

S. E. Chen, "QuickTime® VR—An Image–Based Approach to Virtual Environment Navigation," Proc. Siggraph'95, Aug. 1995, pp. 29–38.

D. Aliaga, "Visualization of Complex Models Using Dynamic Texture–Based Simplification," Proc. *IEEE Visualization '96*, Oct. 1996, pp. 101–106.

D. Aliaga and A. Lastra, "Architectural Walkthroughs Using Portal Textures," Proc. *IEEE Visualization '97*, Oct. 1997, pp. 355–362.

B. Chamberlain et al., "Fast Rendering of Complex Environments Using a Spatial Hierarchy," Jul. 2, 1995, pp. 1–22.

T. A. Funkhouser and C. H. Sequin, "Adaptive Display Algorithm for Interactive Frame Rates During Visualization of Complex Virtual Environments," Proc. Siggraph'93, Aug. 1993, pp. 247–254.

S. Coorg and S. J. Teller, "Real–Time Occlusion Culling for Models with Large Occluders," Proc. Sympos. On Interactive 3D Graphics, 1997, pp. 83–90.

N. Greene et al., "Hierarchical Z–Buffer Visibility," Proc. Siggraph'93, 1993, pp. 231–238.

B.–O. Schneider and I. Martin, "Methods and Apparatus for Providing 3D Viewpoint Selection in a Server/Client Arrangement," U.S. patent application No. 09/229,793, 41 pages.

\* cited by examiner

METHODS AND APPARATUS FOR TRANSMISSION AND RENDERING OF COMPLEX 3D MODELS OVER NETWORKS USING MIXED REPRESENTATIONS

This application claims priority from Provisional Application Serial No. 60/161,428 which was filed on Oct. 26, 1999.

FIELD OF THE INVENTION

This invention relates generally to computer network transmission systems and, in particular, to those capable of storing and transmitting three-dimensional (3D) models. In addition, the invention also relates to graphics processing and display systems capable of rendering together for display combinations of two-dimensional (2D) and three-dimensional (3D) representations of 3D models consisting of one or more components.

BACKGROUND OF THE INVENTION

A model is a representation of some (not necessarily all) features of a concrete or abstract entity. See J. D. Foley et al., *Computer Graphics: Principles and Practice*, Addison-Wesley, 1992, which is herein incorporated by reference in its entirety (herein after Fole92). The purpose of a model of an entity is to allow the visualization and understanding of the structure or behavior of the entity. In particular, computer-based models are those that represent three-dimensional (3D) objects and lend themselves to graphic interpretation. Each model may comprise one or more components that correspond to the various parts of the entity represented by the model.

To transfer a 3D model over a network, its components have to be transferred between computers connected to the network. For example, a popular method of transferring 3D models over networks is using the Virtual Reality Modeling Language (VRML). See R. Carrey and G. Bell, "The Annotated VRML 2.0 Reference Manual", Addison-Wesley, 1997, herein incorporated by reference in its entirety. Other examples include the transmission of one or more 2D images of a model generated on one or more computers to other computers (see U.S. patent application Ser. No. 09/229,793 to B.-O. Schneider and I. Martin entitled "Methods and Apparatus for Providing 3D Viewpoint Selection in a Server/Client Arrangement", IBM docket number Y0998-493, filed on Jan. 13, 1999), the transmission of a compressed representation of a 3D model (see G. Taubin and J. Rossignac, "Geometry Compression Through Topological Surgery", *ACM Transactions on Graphics*, April 1998, pp. 84–115), and the progressive transmission of 3D model data (see H. Hoppe, "Progressive Meshes", *Proc. Siggraph '96*, August 1996, pp. 99–108). All of these references are herein incorporated by reference in their entirety. The VRML description of the 3D model, the 2D image(s), the model in compressed form, and the progressive description constitute examples of representations of the model.

A fundamental problem in transmitting a 3D model over a network is that a representation is typically selected apriori and used to transfer the entire model. Thus, the transmission is not adaptive, i.e., it does not take into account differences in environment conditions and capabilities of various computers involved in the transfer. A particular representation may be very suitable for certain system configurations and models of a certain size, while it may cause a significant decrease in performance for others. Recently, people have begun to recognize the importance of adaptive transmission, and attempts to implement corresponding strategies have emerged. See B.-O. Schneider and I. Martin, "An Adaptive Framework for 3D Graphics in Networked and Mobile Environments", *Proc. Workshop on Interactive Applications of Mobile Computing* (IMC '98), November 1998, (herein after Schn98) which is herein incorporated by reference in its entirety.

A difficult problem to be solved when implementing adaptive transmission is to determine an optimal combination of representations to be used for transmitting the various components of a 3D model, given multiple constraints and criteria. Once such a combination is found, another problem is to mix and manage the different representations for display purposes. Finally, yet another degree of difficulty is introduced when attempting to determine and manage the various representations dynamically, as changing environment conditions cause the optimal combination to change.

In Schn98 the authors propose an adaptive framework that hosts several transmission methods. The selection of an optimal combination of these methods takes into account user preferences and various system parameters, including server performance, server load, available network bandwidth, client capabilities, and client load. The idea is to divide the transmission of the model into two segments (the first manipulable model and the rest of the model) and apply a design-to-time approach to generate a number of alternatives that combine methods with highest quality, shortest duration, highest interactivity, etc. for each of the segments. (For a description of the design-to-time approach, see A. J. Garvey and V. R. Lesser, "Design-to-time Real-Time Scheduling", *IEEE Transactions on Systems, Man, and Cybernetics*, 23(6),1993, pp. 1491–1500, herein incorporated by reference in its entirety.) One of these alternatives is then selected based on a heuristic that takes into account user preferences. This approach has the disadvantages that it assumes an apriori segmentation of the model into transmission segments and it does not provide support for dynamic combination of representations. In addition, it is difficult to define meaningful ratings for the various heuristics used in order to rank the alternatives as required by the design-to-time approach.

A different selective approach is proposed in Computer Network Data Distribution and Selective Retrieval System, U.S. Pat. No. 5,675,721, to A. S. Freedman, M. L. Neri, herein incorporated by reference in its entirety. In this case, objects of a virtual world scattered across a distributed environment are transmitted from a network source to a requesting computer. The data associated with a model is prioritized in the order of its relevance to the user. The virtual scene is represented as a hierarchy of perceivable objects which can be visible, audible, tactile, etc. and in turn, may be composed of other perceivable sub-objects that constitute a more detailed description of the parent object. A detail threshold value is used to control how much information is transmitted over the network, as the user navigates the scene. The approach is limited, however, in that it does not take into account any other parameters of the environment (e.g., bandwidth and load of the transmitting node). Moreover, only a single representation is associated with a perceivable object at each level of the hierarchy.

A number of strategies have been proposed for navigation of complex scenes in non-networked environments (i.e., the model is stored locally, on the computer on which the navigation takes place). These methods address the quality-interactivity tradeoff, i.e., how to navigate through a complex scene at interactive rates while maintaining a meaningful detail level for the visible objects. Typically, these strategies make heavy use of image-based rendering techniques, such as morphing and textured impostors and do not address the issue of how to combine various geometric and image-based representations dynamically in a networked context. See P. W. C. Maciel and P. Shirley, "Visual Navigation of Large Environments Using Textured Clusters", *Symposium on Interactive 3D Graphics*, 1995, pp. 95–102 (herein after Maci95); S. E. Chen, "QuickTime VR—An Image-Based Approach to Virtual Environment Navigation", *Proc. Siggraph '95*, Aug. 1995, pp. 29–38; D. Aliaga, "Visualization of Complex Models Using Dynamic Texture-Based Simplification", *Proc. IEEE Visualization '96*, October 1996, pp. 101–106; and D. Aliaga and A. Lastra, "Architectural Walkthroughs Using Portal Textures", *Proc. IEEE Visualization '97*, October 1997, pp. 355–362, which are herein incorporated by reference in their entirety.

OBJECTS OF THE INVENTION

An object of this invention is an improved system and method for transmitting 3D models over networks.

An object of this invention is an improved system and method for transmitting 3D models adaptively.

An object of this invention is an improved system and method for transmitting 3D models adaptively using a hierarchy of prioritized 3D model component representations.

An object of this invention is an improved system and method for adaptively and dynamically managing (i.e, selecting and combining for transmission and display) multiple representations of components of 3D models.

SUMMARY OF THE INVENTION

The present invention is a system, method, and product for adaptive network transmission of 3D models. The models comprise one or more model components and are viewed from a viewpoint that may change in time. A model hierarchy is built, with one or more nodes, by clustering together one or more of the model components based on one or more clustering criteria. One or more representations are associated with each node in the hierarchy. A cost function is associated with the model hierarchy and used to determine a cost of each representation at each node. A visibility of each node in the hierarchy from the current viewpoint is evaluated and associated with the respective node. A contribution of each node to an image of the 3D model to be rendered by one or more of the clients is evaluated. The 3D model hierarchy is traversed to select one or more of the representations to be transmitted to the client using a prioritization scheme that accounts for the visibility and contribution of each respective nodes.

BRIEF DESCRIPTION OF THE FIGURES

The foregoing and other objects, aspects, and advantages will be better understood from the following non limiting detailed descriptions of preferred embodiments of the invention with reference to the drawings that include the following:

FIG. 7 contains a detailed description of the four basic steps (shown as FIGS. 7A–7D) illustrated in FIG. 6 where:

DETAILED DESCRIPTION OF THE INVENTION

Figure 1:
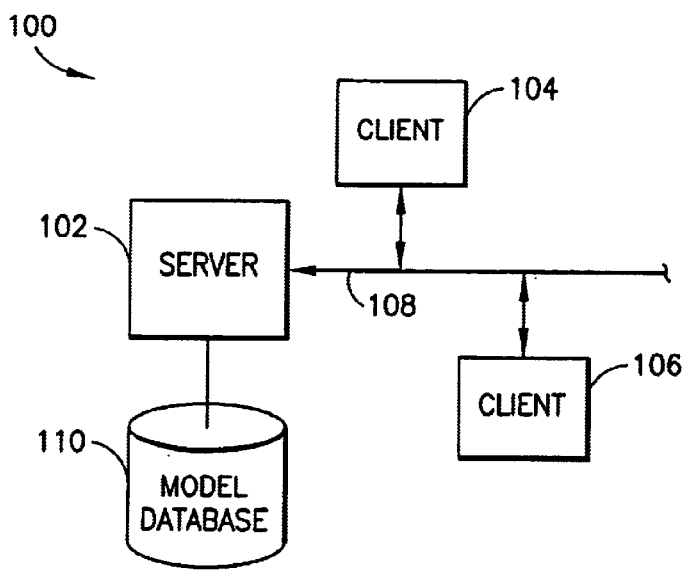
FIG. 1 is a simplified block diagram of a prior art client/server graphics processing system.

FIG. 1 shows a prior art client/server system 100 where one or more first data processors referred to as the server(s) 102 is coupled to a plurality of second data processors referred to as clients 104 and 106, through a data communication network 108. The clients (104, 106) could be well known mainframe computers, personal computers, mobile computers, or any device that includes a computing device and a display capable of displaying a model to a user. The network 108 may be a wired network, a wireless network, internet, intranet and/or some combination of wired and wireless networks.

In general, the server 102 provides data to the clients 104 and 106, as requested by the clients. In the case of most interest, the data provided by the server 102 is graphics data representing 3D models to be displayed by the clients (104, 106). Each client (104, 106) is assumed to have some type of user interface whereby a user can request a model to be transmitted by the server and can command a change of the parameters that define how a model is to be viewed. The models are assumed to exist stored on a plurality of storage media referred to as the model database 110. These storage media may exist locally on the server, at a remote location, or a combination of the two. The server 102 is assumed to have access to the model database either directly or via a network connection.

Typically, there are many well-known ways of representing a 3D model. Examples of representations include polygonal representations, 2D images of the model rendered from various viewpoints, level-of-detail (LOD) representations, progressive representations, panoramas, 2D images augmented with depth information, and implicit surfaces.

In accordance with the teachings of this invention, a choice of the most suitable combination of representations for a model made of one or more components is made adaptively, in a manner that is dependent on user preferences and transmission context. The transmission context is defined here as the plurality of parameters that characterize the environment in which a client/server pair operates. Examples of such parameters include client hardware characteristics, server load, server hardware characteristics, and network bandwidth.

Also in accordance with the teachings of this invention, the choice of the most suitable combination of representations is dynamically updated as the transmission context changes over time.

Figure 2A:
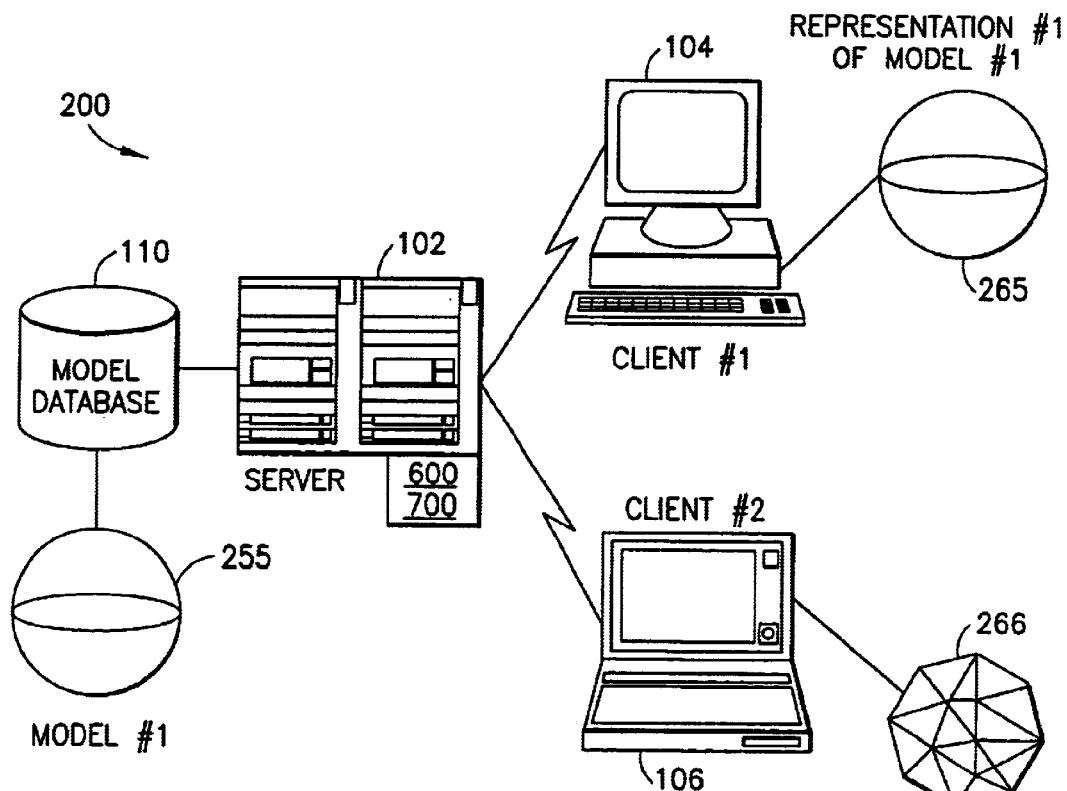
FIG. 2 is a conceptual representation of a system using an adaptive selection process running either on the server (as illustrated in FIG. 2A) or on each of the clients (as illustrated in FIG. 2B) which determines the transmission of two possibly distinct representations of the same 3D model from the server to the two clients.

The selection of the optimal combination of representations can be done either on the server side or on the client side. FIG. 2A is a conceptual representation of a system 200 using an adaptive selection process (600, 700) running on the server 102. After a client requests a specific model, the server retrieves the characteristics of the model from the model database and it runs the selection algorithm (600, 700) described to determine the most suitable representation of the model to be transmitted to the client for display purposes. In this case, the client (104, 106) supplies information about its environment characteristics to the server 102 which, in turn, evaluates the transmission context and performs the selection. As soon as a representation is selected by the server, it is sent to the client for display.

Figure 2B:
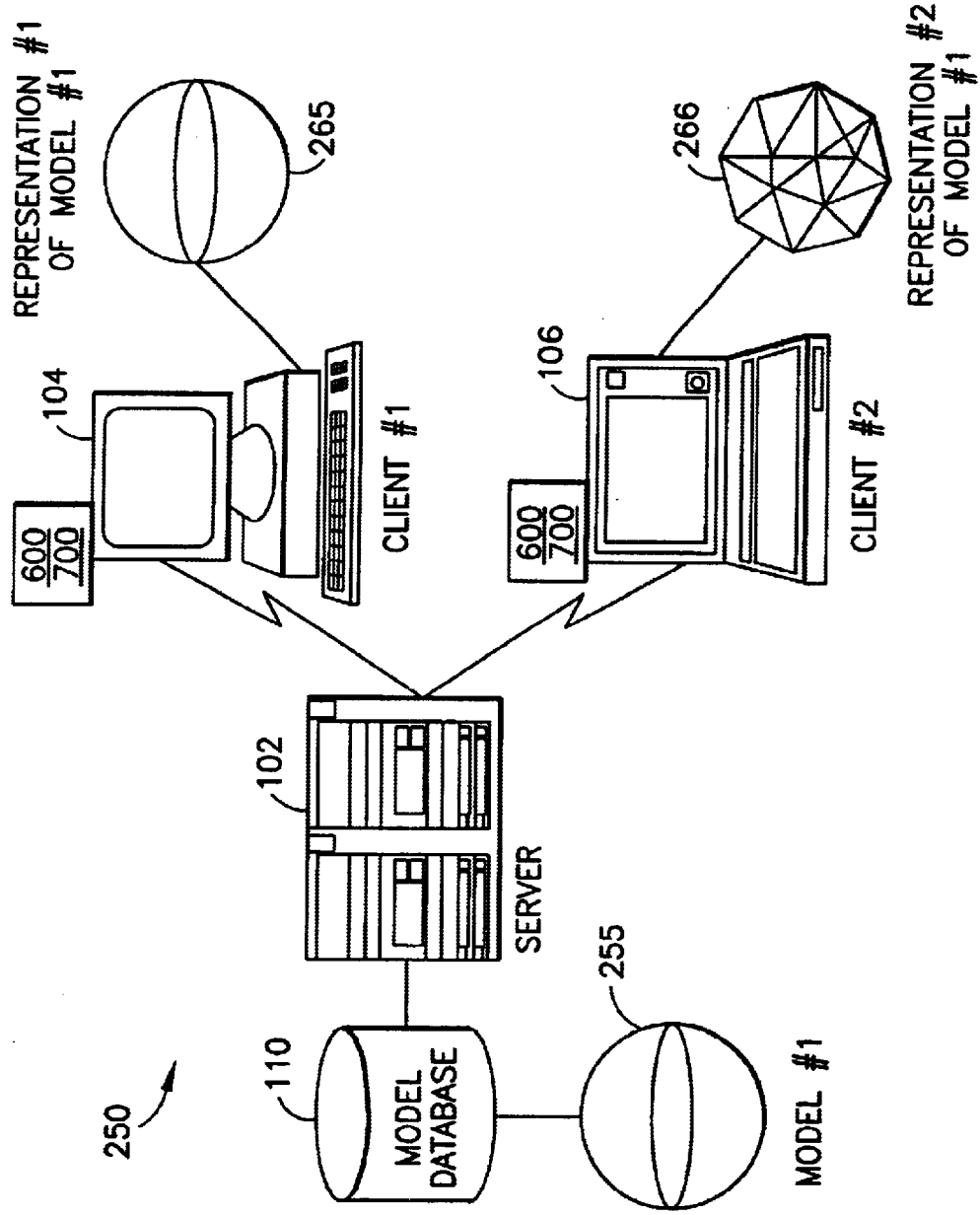

FIG. 2B is a conceptual representation of a system 250 using an adaptive selection process running on each of the clients (typically 106). After a client 106 requests a specific model, the server retrieves the characteristics of the model from the model database and sends them to the client along with information about its environment characteristics. The client uses this information to drive the selection algorithm described in this invention to determine the most suitable representation of the model and requests the selected representations from the server 102. As soon as the server receives the request for a specific representation, it retrieves it from storage or it generates it (if the representation does not exist in the database) and sends it to the client for display.

Depending on the model, user preferences, and transmission context, two different clients that request the same model, may receive two different representations of it. FIGS. 2A and 2B illustrate such an example in which two clients 104 and 106 request model 255 from the server. Due to differences in the above mentioned parameters, the first client 104 receives a representation 265 of the model which is an exact replica of the model, whereas the second client 106 receives only a coarse approximation 266 of the model.

Figure 3:
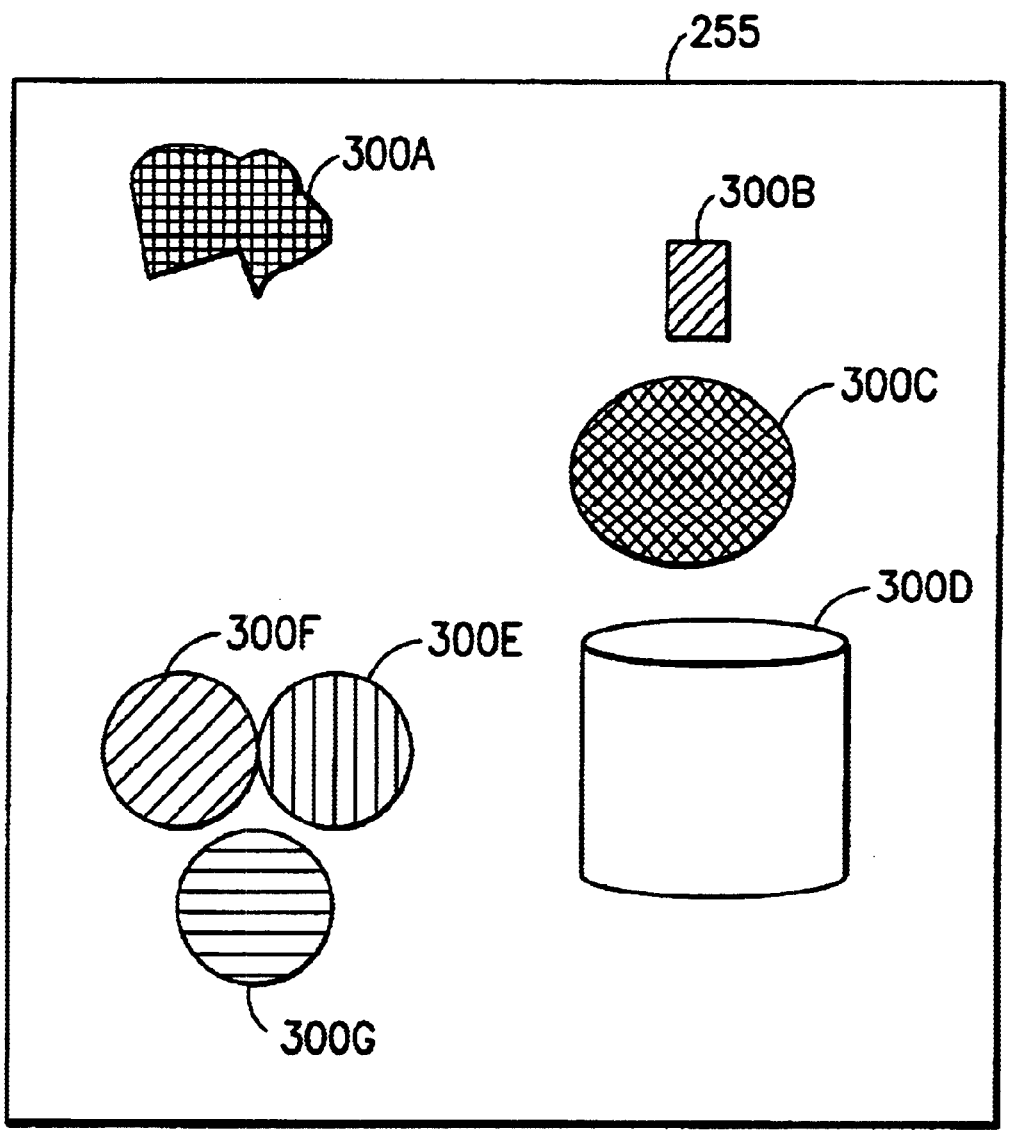
FIG. 3 is a block diagram of a prior art example 3D model consisting of several components.

Each model as considered by this invention is assumed to comprise one or more components. A component is defined as an atomic part of a model 255 that is semantically meaningful and can be individually transmitted to a client for rendering purposes. FIG. 3 is a block diagram of a prior art example 3D model consisting of seven components (300A–300G, typically 300).

The selection mechanism (600, 700) described as part of this invention is governed by a hierarchical representation of the model, e.g., 255. (See FIG. 4B.) In order to manage the representations for the selection process (600, 700), model components, e.g., 300, are considered for transmission individually, or together with other components that are related to them according to some criterion. Examples of criteria include spatial/temporal proximity (i.e., components that are sufficiently close to one another are part of the same cluster) and semantic similarity (i.e., components that are part of the same semantic structure of the model belong to the same cluster). Base on a chosen criterion, components are clustered together hierarchically: individual components are grouped to form clusters, and clusters and individual components are further grouped to form larger clusters. The entire model can be regarded as a cluster that includes all the components of the model.

Grouping/clustering of components (see FIG. 4A) based on spatial closeness is at the basis of numerous rendering methods and a number algorithms have been developed for this purpose. An example can be found in B. Chamberlain et al., Fast rendering of Complex Environments Using a Spatial Hierarchy, University of Washington Technical Report, #UW-CSE-95-05-02, 1995 which is herein incorporated by reference in its entirety. In principle, any such clustering technique can be used to build the model hierarchy used by the selection algorithm (600, 700) described in this invention. For the purpose of this invention, the model hierarchy serves multiple roles: it constitutes a data structure for managing the components of the model and multiple representations associated with them and it provides a mechanism for selecting the best representations to be transmitted to a client, for deciding which parts of a model are to be rendered on the server and which parts are to be rendered on the client, and for prioritizing model components during processing.

Figure 4A:
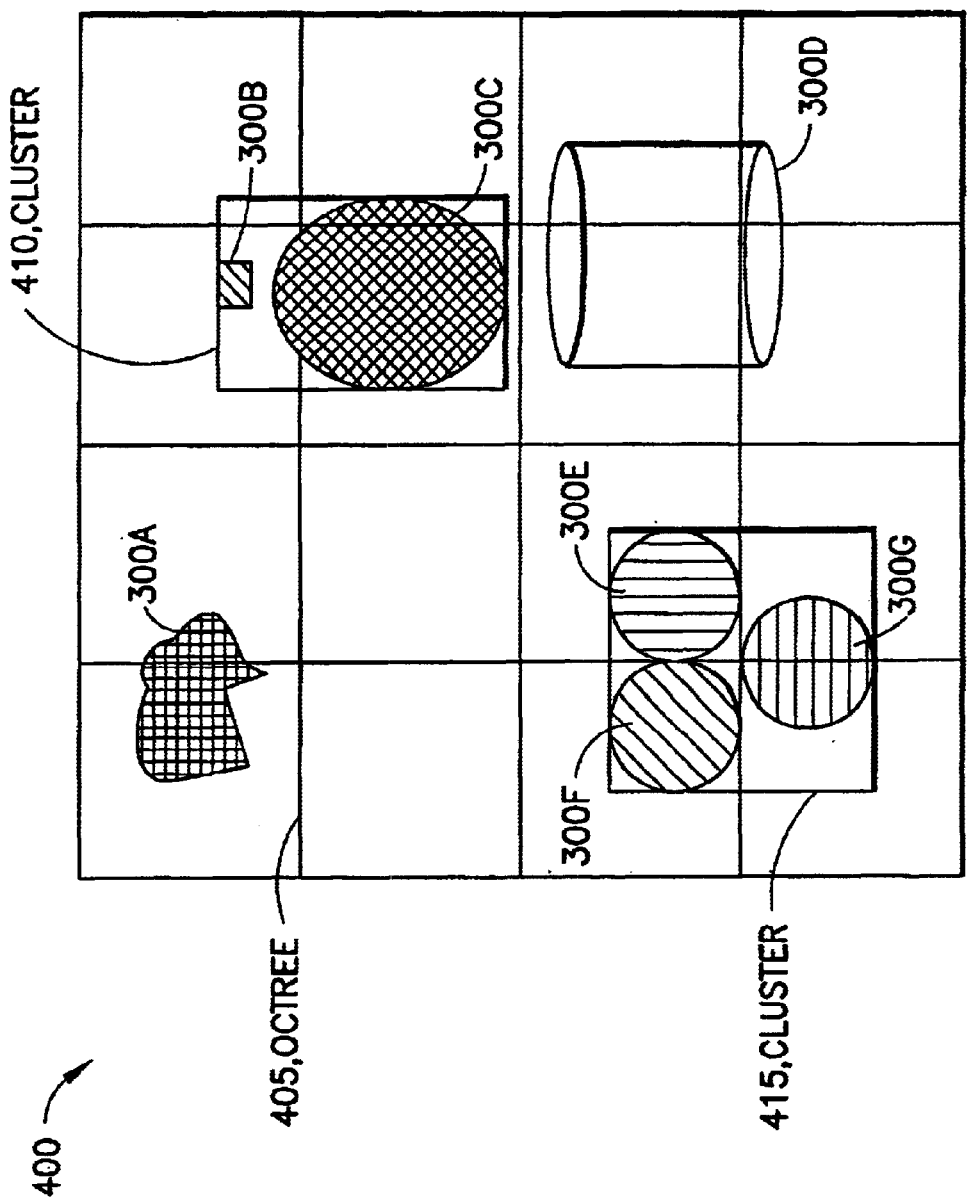
FIG. 4A is a prior art block diagram of a conceptual example of a spatial partitioning used to generate a 3D model hierarchy for the example 3D model shown in FIG. 3.

FIG. 4A is a prior art block diagram of a conceptual example of a clustering technique based on spatial proximity used to generate a 3D model hierarchy for the example 3D model shown in FIG. 3. The simple clustering scheme used in this example uses an octree structure 405 (see Fole92) to achieve the spatial grouping/clustering. Components 300 that fall within the same octree cell at each level of the octree subdivision are grouped together to form clusters 410, 415, and 400 (which corresponds to the entire model).

Figure 4B:
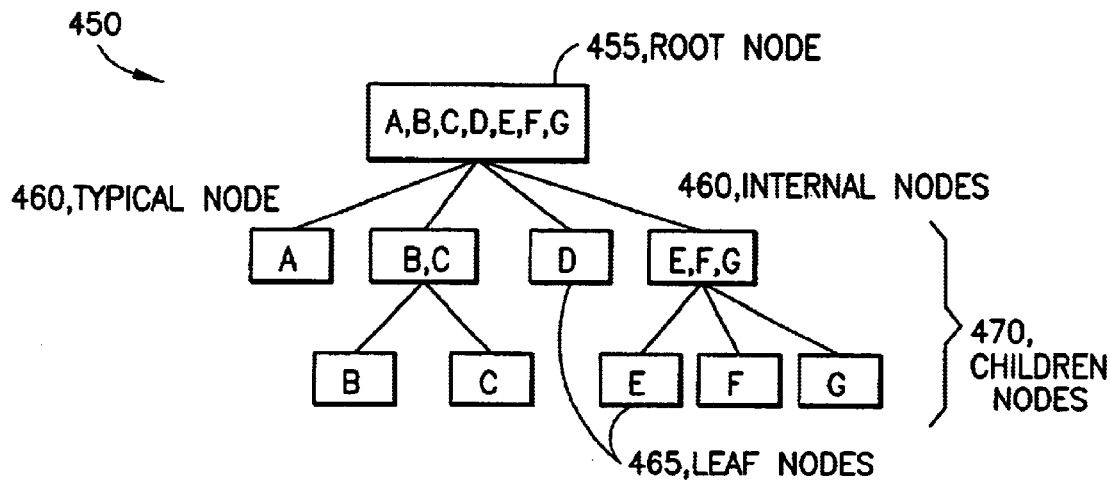
FIG. 4B is a prior art block diagram of the example model hierarchy generated using the spatial partitioning scheme illustrated in FIG. 4A.

FIG. 4B is a prior art block diagram of the example model hierarchy 450 generated using the spatial clustering scheme illustrated in FIG. 4A. The leaves of the hierarchy 465 correspond to the individual components of the model, the internal nodes 460 correspond to clusters of components, and the root node 455 corresponds to the entire model. Children nodes 470 are nodes that are not root nodes 455.

After the hierarchy is formed, representations are associated with each of its nodes. The data for some of these representations (e.g., those that are view independent) may be pre-computed and stored with the model. For other representations (e.g., the view-dependent ones) the actual data may be generated on-the-fly, as nodes are selected for network transmission during the selection process.

Figure 4C:
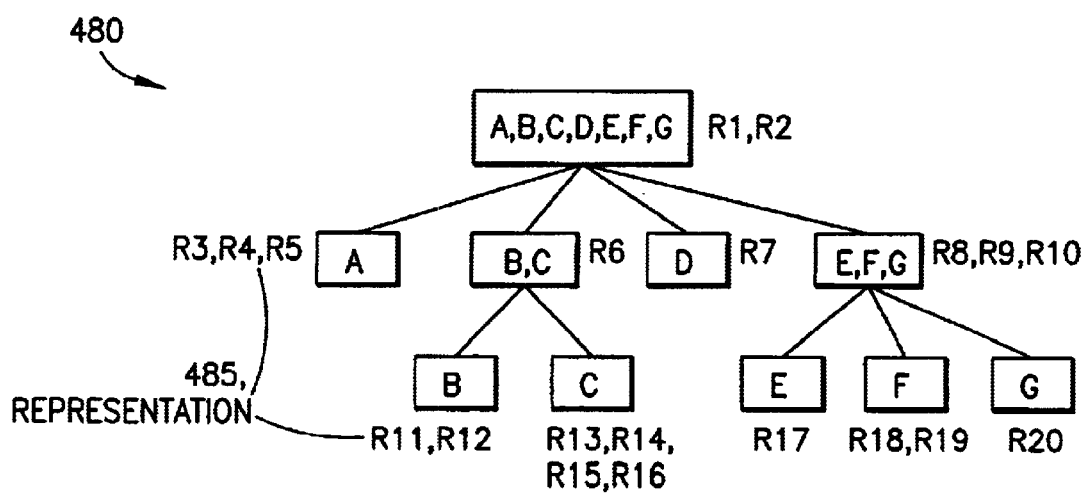
FIG. 4C is a prior art block diagram showing multiple representations 605 associated with each node in the example model hierarchy illustrated in FIG. 4B.

FIG. 4C is a prior art block diagram showing multiple representations 485 associated with each node in the example model hierarchy illustrated in FIG. 4B.

In order to select an appropriate combination of representations for a given model and transmission context, performance parameters have to be estimated for each particular representation. For instance, one needs to determine how long it would take to deliver a given representation 485 to a client, at what frame rate it could be manipulated on the client, and how well it approximates the original model. Thus, each representation includes an interface that allows the client-server framework to estimate its overall cost of transmission. The cost can be defined in a number of ways, as a function ρ of various parameters that meaningfully characterize the transmission context and reflect user preferences.

For example, in a preferred embodiment of this invention, the cost associated with each representation might be defined as a function of three parameters: the time T necessary to deliver the representation to the client, the degree I of interaction it provides, and its quality Q. More rigorously:

T—delivery time: comprises the time necessary to retrieve the representation from the server database, the time to transmit it over the network to the client, and the time to display it on the client for the first time. If the representation must be generated on the fly (e.g., an image from a specified viewpoint), then T will also include the time necessary to generate the representation.

I—degree of interaction: is measured in terms of the frame rate achievable on the client and the number of degrees of freedom for manipulating the representation.

Q—quality: represents a measure of how well the representation rendered on the client approximates a rendering of the corresponding components if they were available to that client in their original representations. It can be defined as a number in the interval [0, 1], where 0 signifies that no representation is available for a given component or cluster, and 1 is the quality associated with the original representation In this example, if $\Re$ denotes the set of all representations associated with the model hierarchy and T, I, and Q are defined as: T: $\Re \to [0, \infty)$, I: $\Re \to [0, 1]$, and Q: $\Re \to [0, 1]$, the cost function ρ can be defined as:

$$\rho \Re \to [0, \infty) \times [0, 1] \times [0, 1]$$

$$\rho(r) = (T(r), I(r), Q(r)), \forall r \in \Re$$

To compare the costs associated with two representations, an order relation has to be defined on $[0, \infty) \times [0, 1] \times [0, 1]$. Ideally, such an order should be a total order relation, i.e., given any two representations $r_1$ and $r_2$ associated with the same component or cluster, one should be able to decide if the cost associated with $r_1$ is smaller, equal, or larger than the cost associated with $r_2$. For example, a decision can be made either by the user or by the system, that for a particular transmission a short delivery time is more important than having a high degree of interaction with the representation In this case, a total order can be defined as follows:

$$\rho(r_1) < \rho(r_2) \Leftrightarrow (T(r_1) < T(r_2) \text{ or } (T(r_1) = T(r_2) \text{ and } I(r_1) > I(r_2))).$$

However, depending on the concrete definition of the cost function, partial orders may also be useful. As an example, the following expression defines a partial order:

$$\rho(r_1) < \rho(r_2) \Leftrightarrow (T(r_1) < T(r_2) \text{ and } Q(r_1) > Q(r_2)).$$

This means that given two representations $r_1$ and $r_2$, the cost associated with $r_1$ is less than the cost associated with $r_2$ if and only if the time it takes to deliver $r_1$ given a server-client pair is less than the time to deliver $r_2$ given the same pair and the quality of $r_1$ is higher than the quality of $r_2$. Evidently, there may be $r_1$, $r_2$ pairs for which it cannot be said that the cost of $r_1$ is less or more than the cost of $r_2$, for example when $r_1$ is a compact (i.e., requires a short transmission time), low quality representation and $r_2$ is a larger (i.e., requires a longer transmission time), higher quality representation. In such a case, when the selection process (600, 700) encounters such a pair, it simply ignores both representations. However, care must be taken in defining the order relation to ensure that there are sufficient representations that can be compared and used in the selection process.

To compare the cost of a representation associated with an internal node in the model hierarchy (i.e., a node corresponding to a cluster of components) with the representations associated with the children of that node, a combined cost associated with a set of representations has to be defined. The combined cost L of a set of representations $r_1, \ldots, r_n$ can be defined as a function of the costs of these representations:

$$L: \Re \to [0, \infty) \times [0, 1] \times [0, 1]$$

$$L(r_1, \ldots, r_n) = f(\rho(r_1), \ldots, \rho(r_n)),$$

where f: $([0, \infty) \times [0, 1] \times [0, 1])^n \to [0, \infty) \times [0, 1] \times [0, 1]$. For example, f could be defined as:

$$f(\rho(r_1), \ldots, \rho(r_n)) = (T(r_1) + \ldots + T(r_n), \min(I(r_1), \ldots, I(r_n)), \min(Q(r_1), \ldots, Q(r_n))),$$

i.e., the delivery time for the set of representations is equal to the sum of the delivery times of all representations, the interactivity of the set is the lowest of the interactivities of the representations in the set, and similarly, the quality of the set is the lowest of the qualities of the representations in the set. The combined cost is used by the selection process (600, 700) during the traversal of the model hierarchy to decide whether to send a representation associated with the current node or to process and send representations associated with the children of that node (see FIG. 7C, step 760). If there is a set of representations associated with the children of the current node for which the combined cost fits the remaining cost budget for the current transmission, the children of the node are processed. Otherwise a representation is selected from among those associated with the current node and is transferred to the client (e.g., the highest quality representation that fits within the remaining cost budget is selected).

Figure 5:
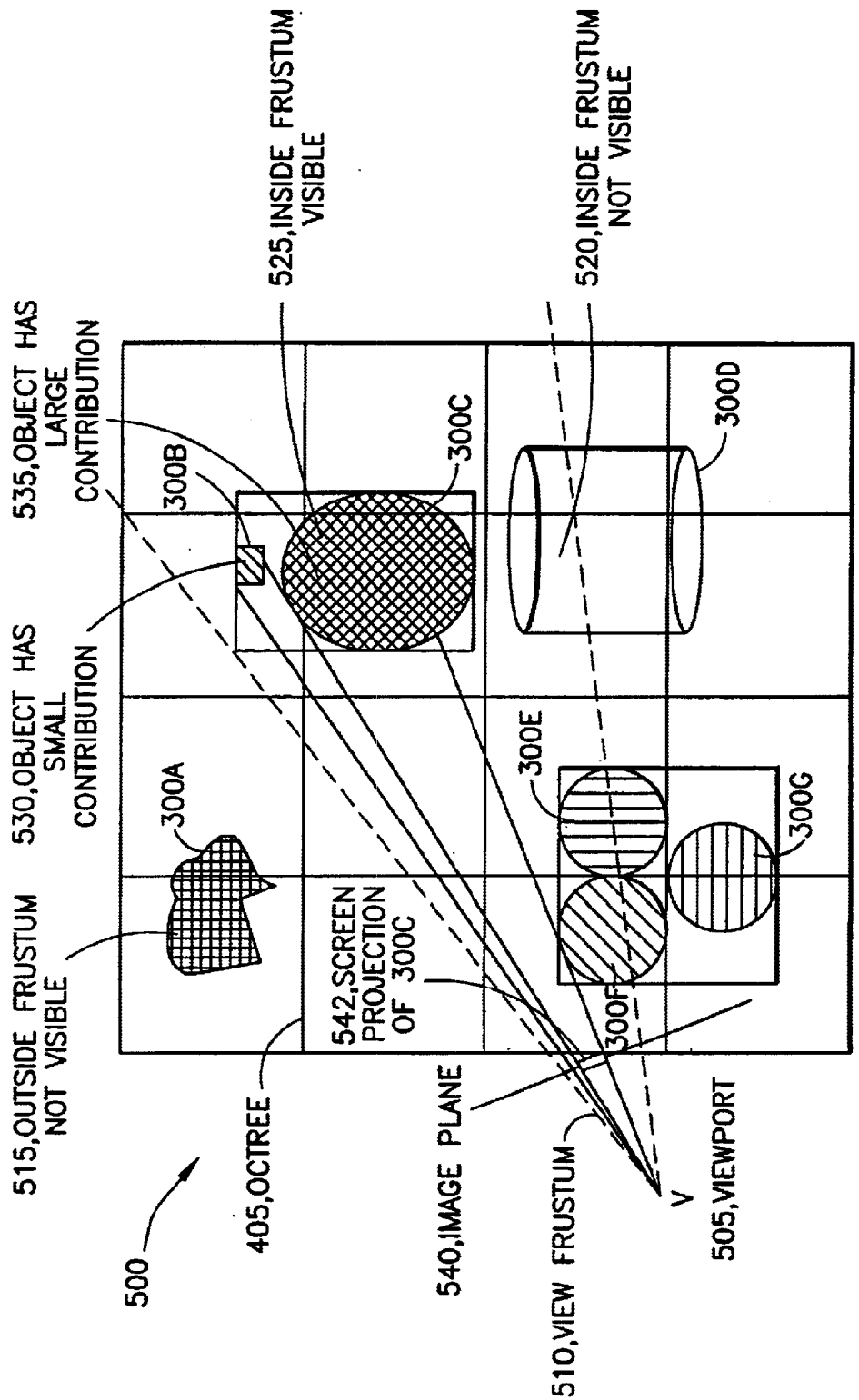
FIG. 5 is a prior art block diagram showing the visibility and contribution of each of the components of the 3D model to a view of the 3D model from a viewpoint.

Defining a cost function as previously described, allows for comparisons between the various representations associated with each of the nodes in the model hierarchy. A simple approach to processing such representations would be to traverse the model hierarchy in some arbitrary fashion (e.g., depth first) and at each node estimate the cost of each representation as well as the combined cost of the children representations to determine what is the best representation that fits within the cost budget. A problem with such an approach is that it does not take into account the importance of the components to the rendering of the model. For example, it may happen that, given a small time budget, most of the nodes selected for processing represent components that are not visible. Thus, when working against a budget, it is desirable to process first the components that are most significant for display on the client. To estimate significance, we incorporate in our selection algorithm two additional measures of significance: the visibility V of a component with respect to the viewpoint and view direction, and its contribution C to the client view. These parameters allow for a prioritization of components when given a limited cost budget:

V—visibility: indicates whether a component or part of it is inside the viewing frustum 510 or not (see FIG. 5).

C—contribution: relates to the perception and semantics of a component or cluster as part of the whole model. It should incorporate factors such as: its projected size onto the screen (i.e., large objects have a higher contribution), its importance to the model, and its proximity to the center of the screen. See T. A. Funkhouser and C. H. Sequin, "Adaptive Display Algorithm for Interactive Frame Rates During Visualization of Complex Virtual Environments", *Proc. Siggraph '93*, August 1993, pp. 247–254. A weighted average of these factors can be used to evaluate this parameter.

FIG. 5 is a prior art block diagram showing the visibility and contribution of each of the components of the example 3D model from FIG. 3. For this example, components 300A and 300G lie completely outside of the viewing frustum, components 300D and 300E intersect the view frustum 510 but are not visible from the viewpoint 505 due to the fact that they are occluded by component 300F, and the only visible components are 300B, 300C, and 300F. If, for the purposes of this example, we consider a measure of contribution to be the projected size of a component or a cluster, then component 300C is considered to have a larger contribution to the final rendered image from the viewpoint shown due to the fact that its projection 542 onto the image plane 540 is smaller than that of component 300B.

Figure 6:
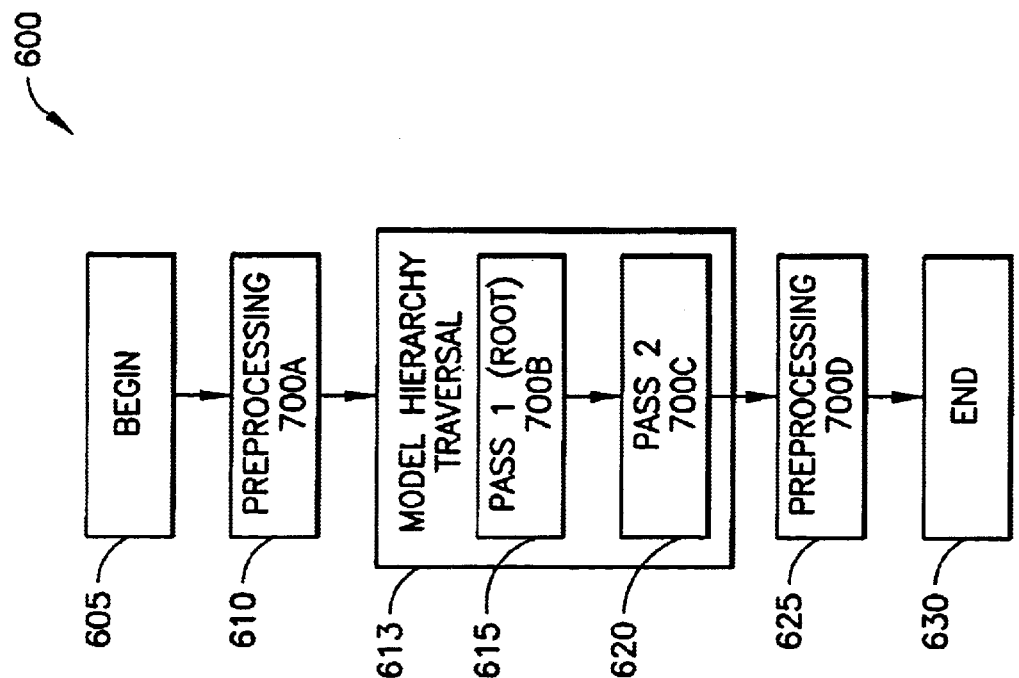
FIG. 6 is a flow diagram of the basic steps of the adaptive selection and transmission procedure described in this invention.

The novel method (600, 700) for transmitting 3D models adaptively over networks described in this invention comprises three main steps, as illustrated in FIG. 6: beginning 605 with a preprocessing step 610, followed by a two-pass hierarchy traversal 613, followed by post processing 625, and ending 630. After a request for a model has been issued by a client and received by a server, the method described herein is used to determine what are the most appropriate representations 485 of the model components to be delivered to the client, given the transmission context characteristics at the moment when the request is made.

Figure 7A:
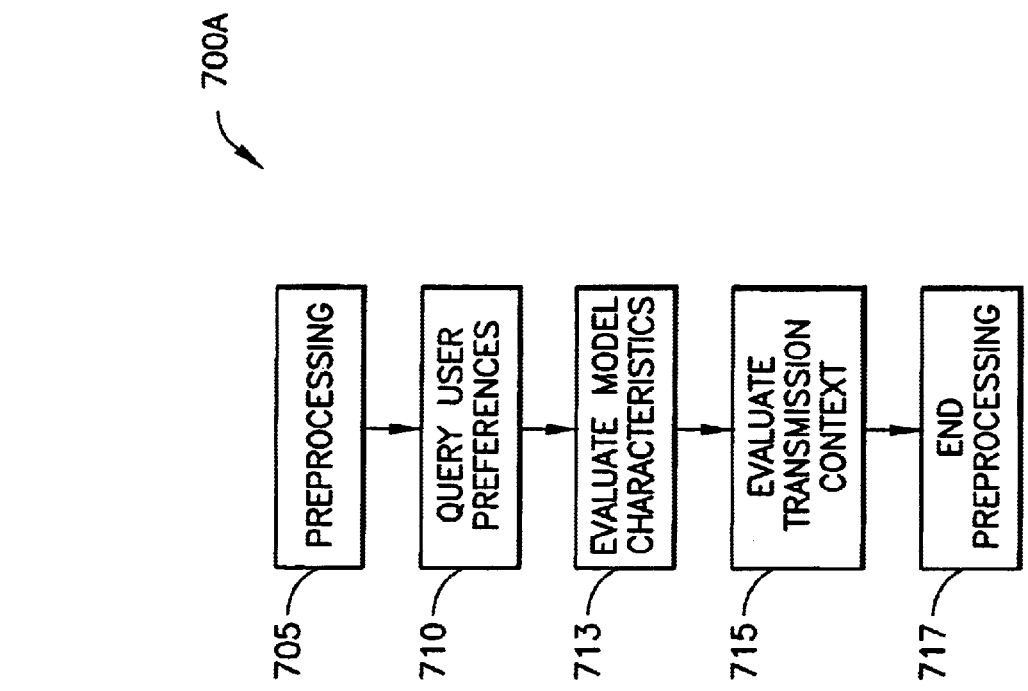
FIG. 7A is a flow chart of the preprocessing step.

FIG. 7A shows the details of the preprocessing step 610, in which user preferences are queried 710, model characteristics are retrieved/evaluated 713, and the transmission context is evaluated 715.

For instance, examples of user preferences 710 are the user's selection of a particular viewpoint 505, the specification of a desired quality level of the rendered model, a set of components that are not of interest, and/or a desired level of interaction with the model.

Examples of retrieved/evaluated model characteristics 713 may include model size, number of components, size of each component, and bounding box information for each component.

The evaluation of transmission context 715 may provide, for example, information about the currently available network bandwidth between a client and a server, the load on a server, and the capabilities of a client.

Part of the information needed in the preprocessing phase 610 may be acquired locally, while part of it may have to be transferred from a remote location. For example, if the selection is performed on the server, information regarding the server load may be locally processed, while information about the client hardware capabilities has to be received from the client.

The second step 613 selects the representations to be delivered to the client (104, 106). Since the selection of representations is constrained by a cost budget, it is desirable that the components that are most significant for display on the client be processed first. In a preferred embodiment, a two-pass scheme is used to compute the visibility and contribution of each node in the hierarchy and then to evaluate only visible components, in decreasing order of their contributions, until the budget is reached.

Figure 7B:
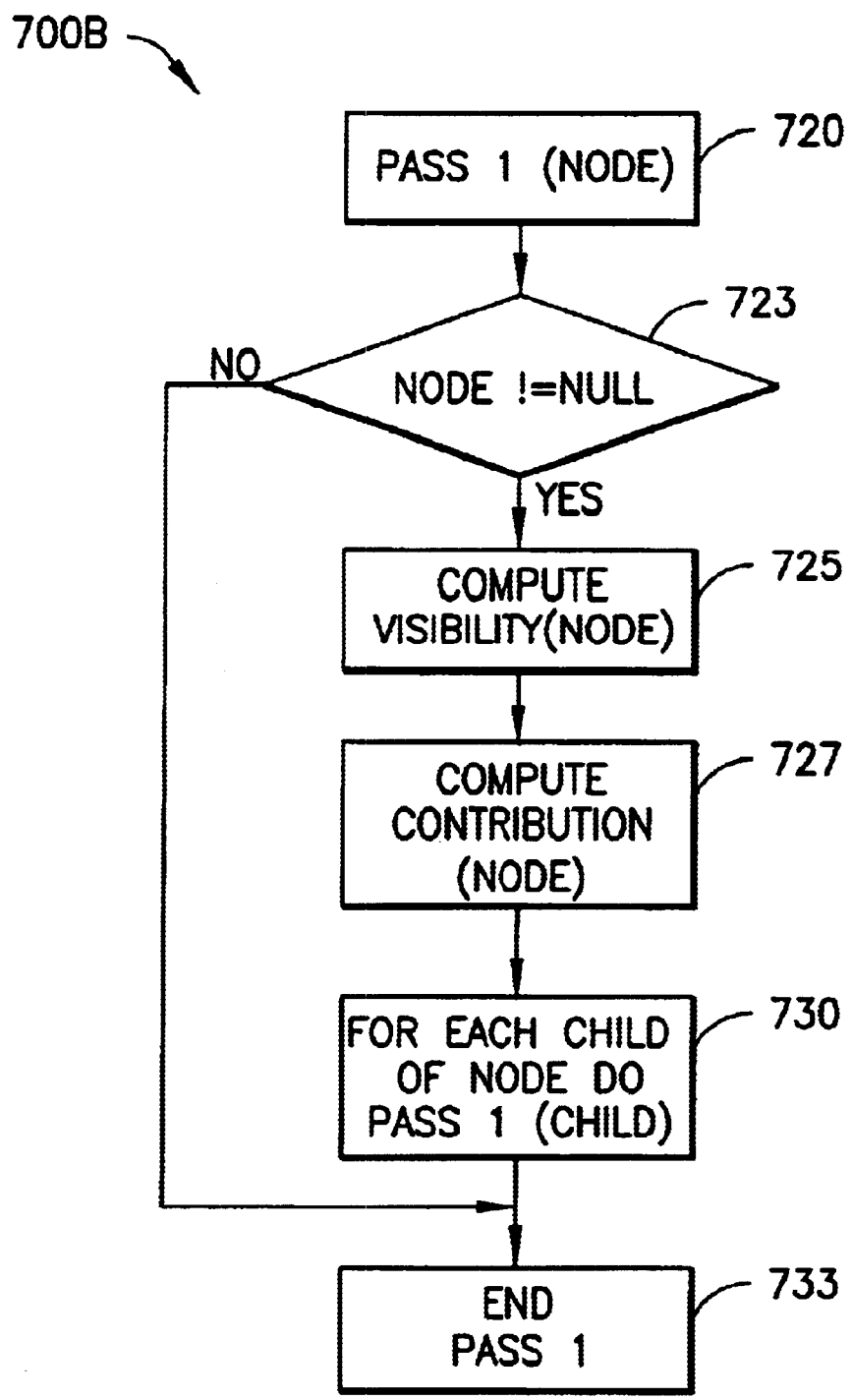
FIG. 7B is a flow chart of the contribution and visibility determination process (first pass) that determines the visibility and contribution of each node in the model hierarchy.
Figure 7C:
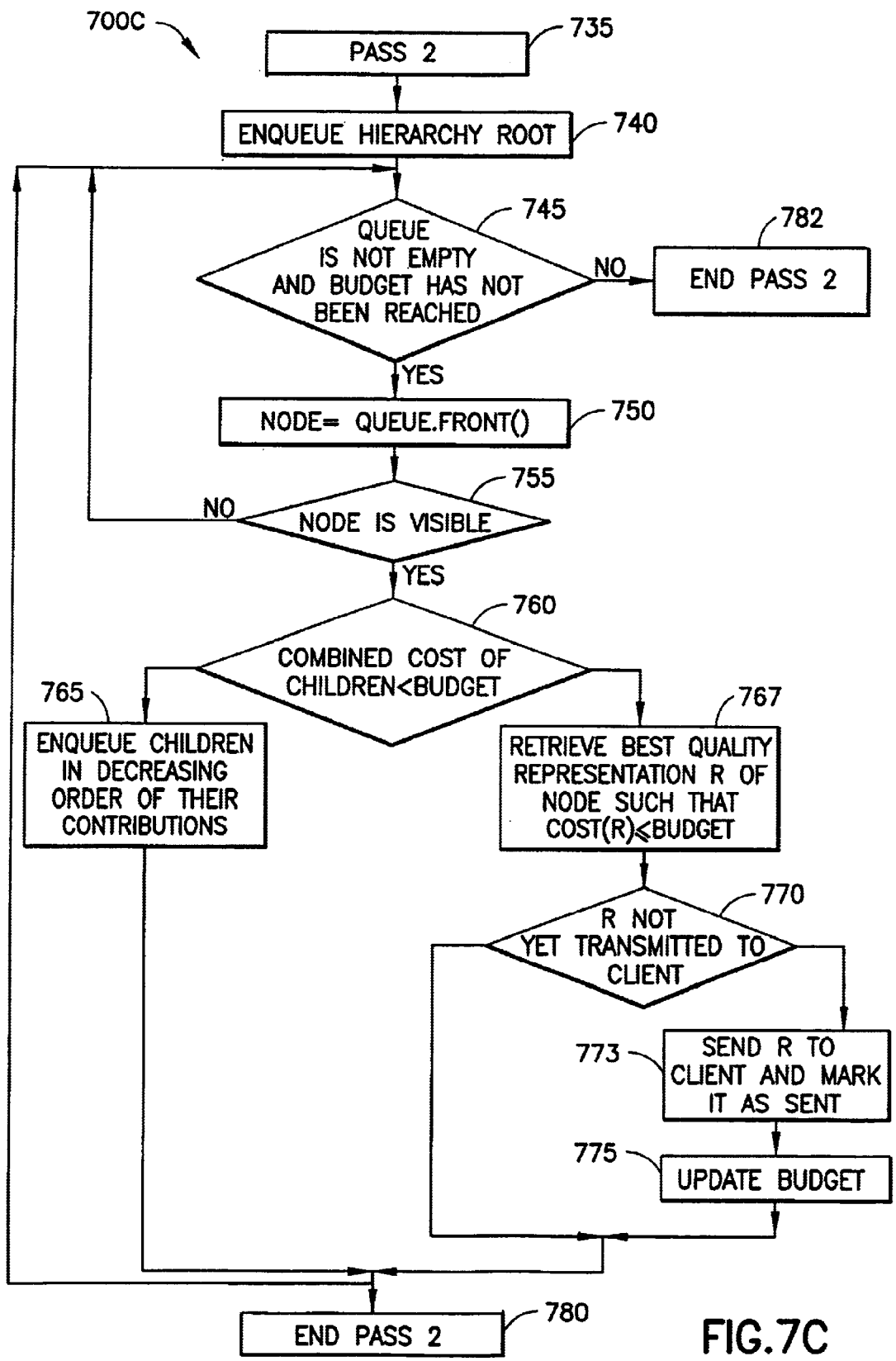
FIG. 7C is a flow chart of an adaptive selection process (second pass) that determines the order of transmission based on the visibility and contribution of the components and a system budget.

In a preferred embodiment, the first pass consists of a recursive traversal of the model hierarchy starting with the root node, in a depth-first fashion (shown in FIG. 7B). First, a termination condition 723 for the recursive procedure is verified to ensure that the recursion ends within a finite number of steps. If the end of a tree branch has not yet been reached the visibility of the current node of the hierarchy is computed 725. This can be done using any of the existing methods for visibility determination such as those described in S. Coorg and S. J. Teller, Real-time Occlusion Culling for Models with Large Occluders, *Proc. Sympos. On Interactive 3D Graphics*, 1997, pp.83–90, and N. Greene et al., Hierarchical Z-buffer Visibility, *Proc. Siggraph '93*, 1993, pp. 231–238, which are herein incorporated by reference in their entirety. Next, the contribution of the current node is also evaluated 727. For leaf nodes 465, the contribution can be defined as a measure of how important the model component associated with that node is to the final rendering as previously described. For internal nodes 460 (i.e., those associated with clusters of components), the contribution can be defined as some function of the contributions of its children. For example, it could be defined as the sum of the contributions of the children or as the largest of the children contributions. In step 730, the process 700B is repeated for each child of the current node.

Figure 8:
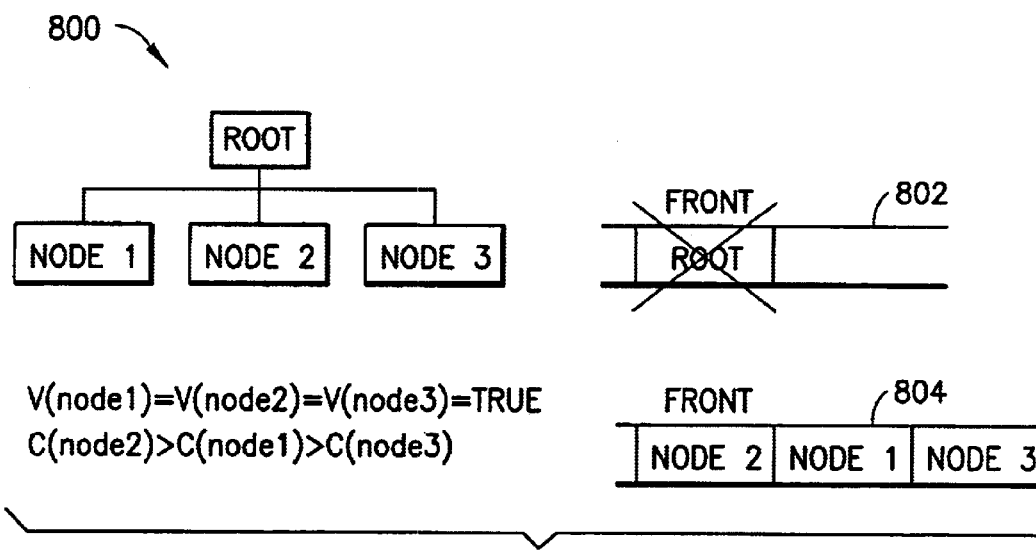
FIG. 8 is a block diagram of a preferred priority structure (priority queue) used by the selection process at two example points in time.

In the second pass (shown in FIG. 7C), the hierarchy is traversed using the information from the first pass. Nodes that are not visible are ignored (step 755). The nodes are prioritized for processing taking into account their contributions. For example, a priority queue (see FIG. 8) may be used to manage the nodes in the order of their contributions.

Initially, the root node of the model hierarchy is placed (step 740) onto the priority queue (e.g., 802). Nodes in the queue are processed in decreasing order of their contributions, until the cost budget is reached or there are no more nodes to be processed (i.e., the priority queue is empty) (step 745). Processing a node consists of ignoring it if it is not visible or, if it is visible, in determining a suitable representation to be delivered to the client. To find a representation suitable for transmission, the combined cost of the child nodes is computed and compared to the current cost budget (step 760). If the combined cost is within the budget, the children of the node are placed (step 765) in the priority queue (e.g., 804) in the order of their contributions and the processing described so far is repeated. If the combined cost of the children is not within the budget, a representation associated with the node that fits within the budget is selected (step 767) (usually the highest quality representation that fits within the budget is selected). If this is not a representation that has already been shipped to the same client (step 770), it is transmitted over the network, marked as sent (step 773), and the cost budget is adjusted accordingly (step 775). If a client already has the selected representation from a previous transmission, it will be instructed to retrieve its local copy, rather than waiting for a duplicate to be transferred from the server. Reusing data that has already been transmitted has several advantages: the transmission time is eliminated, the server load is reduced, and the client can access and display it much faster. The process is repeated for the next node at front of the queue until the queue is empty or the budget is reached.

Figure 7D:
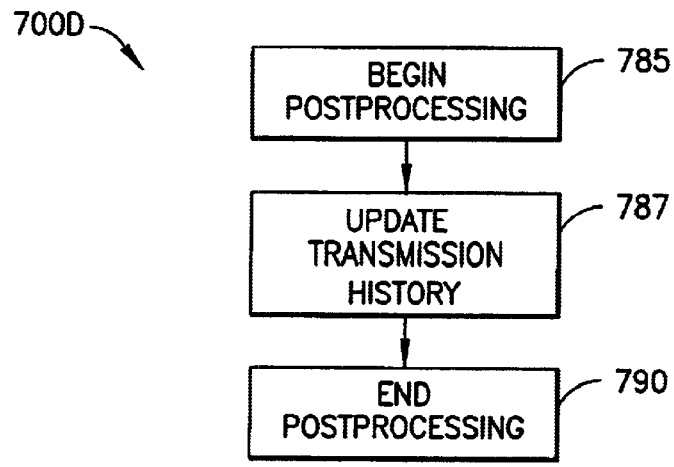
FIG. 7D is a flow chart of the postprocessing step.

Finally, a post processing step (see FIG. 7D) may be performed if a learning process is implemented. In this case, the transmission history recorded and updated after each model is transferred can be used to fine tune the performance evaluation estimators to be used in future transmissions.

Figure 9A:
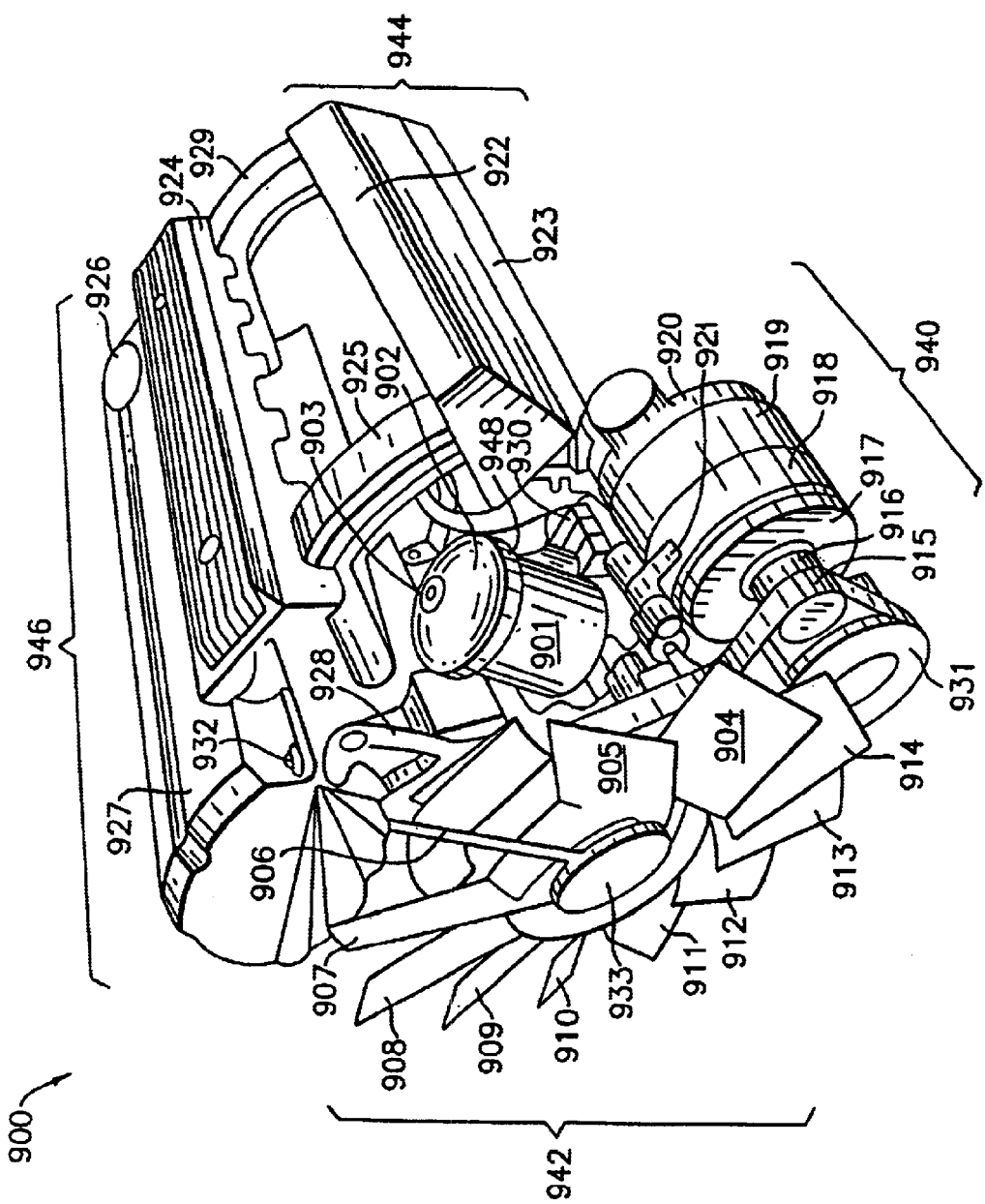
FIG. 9A illustrates an example of engine model with multiple components.

FIG. 9A illustrates an example model 900 of an automobile engine consisting of multiple parts (e.g., 901–933). Components that make up certain engine parts are grouped together into clusters (e.g., 942, 944, 946, 948).

Figure 9B:
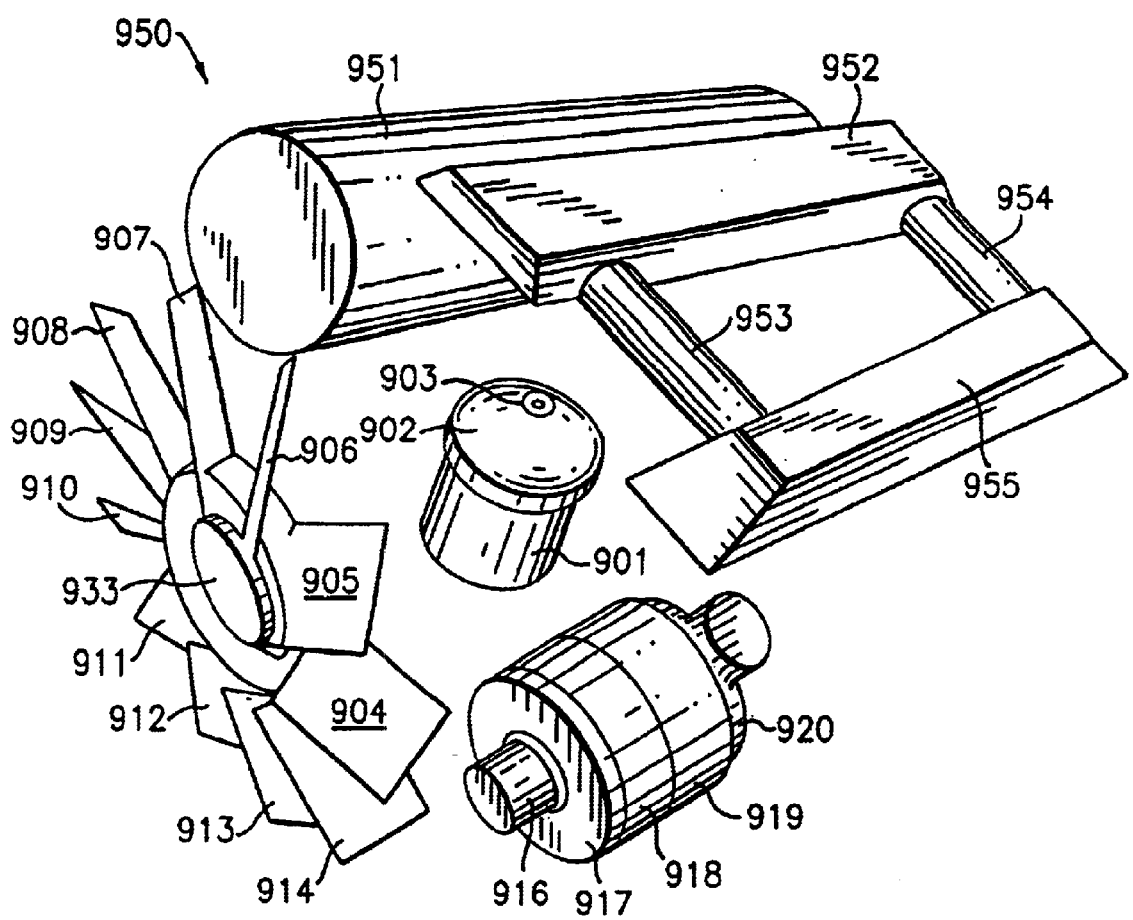
FIG. 9B illustrates a set of representations that might be selected when the selection process described in this invention is used to transfer the engine model shown in FIG. 9A between a server and a client.

FIG. 9B shows the result of applying the selection process (600, 700) to the engine model in FIG. 9A. High quality representations are selected and transmitted for the engine components which contribute the most to a rendered image of the engine as shown (i.e., 904–914, 933, 916–920, 901–903). Other components are considered in clusters and simplified representations (951–955, i.e., boxes and cylinders) are transmitted, one for each cluster. Finally, the remaining parts (not shown in FIG. 9B) are rendered on the server and transmitted as a background image to the client.

I claim:

1. A method for adaptive transmission of 3D models comprising one or more model components expressed in at least one representation, viewed from a viewpoint, the transmission being over a network from one or more servers to a set of one or more client computers, each of said client computers with corresponding display capabilities and network capabilities, the method comprising the steps of:

building a model hierarchy, with one or more nodes, by clustering together one or more of the model components based on one or more clustering criteria;

associating one or more representations with each node in the hierarchy;

associating a cost function with each representation and using the cost function to determine a combined cost for the entire model hierarchy;

receiving from a requesting client a set of user preferences specifying parameters of an image transmission, including capabilities of client apparatus;

receiving from said requesting client a request for a transmission of requested image data from said viewpoint;

dynamically evaluating the transmission context of transmissions over said network at the time of the request including at least estimated parameter values for available bandwidth, server loads and client loads;

establishing a resource budget for the transmission based on said parameters and estimated parameter values;

evaluating a visibility of each node in the hierarchy from said viewpoint and associating the visibility with the respective node;

establishing a prioritization scheme for the resource budget;

evaluating, with respect to the transmission context, a contribution of each node to an image of the 3D model to be rendered by one or more of the clients; and traversing the 3D model hierarchy to select adaptively, in response to the transmission context, a transmission set of one or more of the representations to be transmitted to the client using a prioritization scheme that dynamically selects or rejects a node for transmission to a requesting client based on both the visibility and contribution of each respective nodes and the display and network capabilities of the requesting client and transmitting the transmission set of representations to the client.

2. A method, as in claim 1, where the prioritization scheme comprises the following steps:

starting with a root node of the model hierarchy, recursively processing each of the nodes by discarding the node if the node is not visible and otherwise determining if a combined cost of one or more children of the node fits within a cost budget; and if the combined cost is within the cost budget, recursively processing each of the children in an order of contribution, and if the combined cost is not within the cost budget, selecting, instead of the children, one of the representations of the node for transmission and rejecting other representations of the node.

3. A method, as in claim 1, in which said set of one or more client computers comprises at least two client computers having different capabilities and said parameters of an image transmission comprise parameters specifying data compatible with the display and network capabilities of said client apparatus.

4. A method, as in claim 3, further comprising a step of defining a multi-factor order relation, based on transmission time and at least one other criterion, over the set of all representations associated with a model component, thereby allowing comparisons between representations.

5. A method, as in claim 3, further comprising a step of defining a multi-factor order relation, based on transmission time and at least one other criterion, over the set of all representations associated with a model component, thereby allowing comparisons between representations.

6. A method, as in claim 4, where the combination criteria include any one or more of the following: a spatial proximity and a semantic proximity.

7. A method, as in claim 1, where the representation may be one or more of the following: a 2D object, a 2D object that describes one of the components, a 2D object that describes one or more clusters of components, a 3D object, a 3D object that describes one of the components, and a 3D object that describes one or more clusters components.

8. A method, as in claim 1, where each view independent representation is generated only once and subsequently stored with the hierarchy.

9. A method, as in claim 1, wherein the cost function is a function of a time to deliver one of the representations from the server to the client along with a representation quality and a degree of interactivity.

10. A method, as in claim 1, where a transmission history is recorded and said transmission context is re-evaluated in view of said transmission history to manage multiple transmissions of the same representation.

11. A method, as in claim 1, where representations selected for transmission are a mixture of representations and the mixture is rendered by the client.

12. A computer system for communicating three dimensional models, comprising:

one or more central processing units (CPU) and one or more memories; one or more network connections to one or more networks; one or more three dimensional models stored in one or more of the memories, each of the models being divided into one or more components that are viewed from a viewpoint, each component having one or more representations; a communication process that adaptively communicates one or more of the representations through the network interface to at least two client computers by performing the following steps:

building a model hierarchy, with one or more nodes, by clustering together one or more of the model components based on one or more clustering criteria;

associating one or more representations with each node in the hierarchy;

associating a cost function with each representation and using the cost function to determine a combined cost for the entire model hierarchy;

receiving from a requesting client a set of user preferences specifying parameters of an image transmission, including capabilities of client apparatus;

receiving from said requesting client a request for a transmission of requested image data from said viewpoint;

dynamically evaluating the transmission context of transmissions over said network at the time of the request including at least estimated parameter values for available bandwidth, server loads and client loads;

establishing a resource budget for the transmission based on said parameters and estimated parameter values;

evaluating a visibility of each node in the hierarchy from said viewpoint and associating the visibility with the respective node;

establishing a prioritization scheme for the resource budget;

evaluating, with respect to the transmission context, a contribution of each node to an image of the 3D model to be rendered by one or more of the clients; and traversing the 3D model hierarchy to select adaptively, in response to the transmission context, a transmission set of one or more of the representations to be transmitted to the client using a prioritization scheme that dynamically selects or rejects a node for transmission to a requesting client based on both the visibility and contribution of each respective nodes and the display and network capabilities of the requesting client and transmitting the transmission set of representations to the client.

13. A system, as in claim 12, in which said set of one or more client computers comprises at least two client computers having different capabilities and said parameters of an image transmission comprise parameters specifying data compatible with the display and network capabilities of said client apparatus.

14. A method, as in claim 13, further comprising a step of defining a multi-factor order relation, based on transmission time and at least one other criterion, over the set of all representations associated with a model component, thereby allowing comparisons between representations.

15. A system, as in claim 12, where a transmission history is recorded and said parameters of said transmission context are re-evaluated in view of said transmission history to manage multiple transmissions of the same representation.

16. An article of manufacture comprising a computer program product including computer-readable instruction means which performs the steps of:

building a model hierarchy, with one or more nodes, by clustering together one or more of the model components based on one or more clustering criteria;

associating one or more representations with each node in the hierarchy;

associating a cost function with each representation and using the cost function to determine a combined cost for the entire model hierarchy;

receiving from a requesting client a set of User preferences specifying parameters of an image transmission, including capabilities of client apparatus;

receiving from said requesting client a request for a transmission of requested image data from said viewpoint;

dynamically evaluating the transmission context of transmissions over said network at the time of the request including at least estimated parameter values for available bandwidth, server loads and client loads;

establishing a resource budget for the transmission based on said parameters and estimated parameter values;

evaluating a visibility of each node in the hierarchy from said viewpoint and associating the visibility with the respective node;

establishing a prioritization scheme for the resource budget;

evaluating, with respect to the transmission context, a contribution of each node to an image of the 3D model to be rendered by one or more of the clients; and traversing the 3D model hierarchy to select adaptively, in response to the transmission context, a transmission set of one or more of the representations to be transmitted to the client using a prioritization scheme that dynamically selects or rejects a node for transmission to a requesting client based on both the visibility and contribution of each respective nodes and the display and network capabilities of the requesting client and transmitting the transmission set of representations to the client.

17. An article of manufacture according to claim 16, in which said set of one or more client computers comprises at least two client computers having different capabilities and said parameters of an image transmission comprise parameters specifying data compatible with the display and network capabilities of said client apparatus.

18. A method, as in claim 16, further comprising a step of defining a multi-factor order relation, based on transmission time and at least one other criterion, over the set of all representations associated with a model component, thereby allowing comparisons between representations.

19. A system, as in claim 17, where a transmission history is recorded and said parameters of said transmission context are re-evaluated in view of said transmission history to manage multiple transmissions of the same representation.

20. A method, as in claim 17, further comprising a step of defining a multi-factor order relation, based on transmission time and at least one other criterion, over the set of all representations associated with a model component, thereby allowing comparisons between representations.

21. A method, as in claim 12, further comprising a step of defining a multi-factor order relation, based on transmission time and at least one other criterion, over the set of all representations associated with a model component, thereby allowing comparisons between representations.

* * * * *